(12) United States Patent
Dozier et al.

(10) Patent No.: US 8,798,519 B2
(45) Date of Patent: Aug. 5, 2014

(54) OBJECT-BASED SYSTEM AND LANGUAGE FOR DYNAMIC DATA OR NETWORK INTERACTION INCLUDING LEARNING MANAGEMENT

(75) Inventors: Linda T. Dozier, Great Falls, VA (US); Edmund J. Fish, Herndon, VA (US); Nina Zolt, Washington, DC (US); Miles R. Gilburne, Washington, DC (US)

(73) Assignee: Epals, Inc., Herndon, VA (US)

( * ) Notice: Subject to any disclaimer, the term of this patent is extended or adjusted under 35 U.S.C. 154(b) by 400 days.

(21) Appl. No.: 12/463,266

(22) Filed: May 8, 2009

(65) Prior Publication Data

US 2009/0305218 A1 Dec. 10, 2009

Related U.S. Application Data

(60) Provisional application No. 61/051,673, filed on May 8, 2008.

(51) Int. Cl.
*G09B 3/00* (2006.01)
(52) U.S. Cl.
USPC .......................... 434/350; 434/362; 434/365
(58) Field of Classification Search
USPC .................. 434/322, 323, 350–352, 360–363
See application file for complete search history.

(56) References Cited

U.S. PATENT DOCUMENTS

| | | | |
|---|---|---|---|
| 4,740,912 A | 4/1988 | Whitaker | |
| 5,710,884 A | 1/1998 | Dedrick | |
| 5,740,549 A | 4/1998 | Reilly et al. | |
| 5,761,662 A | 6/1998 | Dasan | |
| 5,768,528 A | 6/1998 | Stumm | |
| 5,772,446 A | 6/1998 | Rosen | |
| 5,813,863 A | 9/1998 | Sloane et al. | |
| 5,863,208 A * | 1/1999 | Ho et al. | 434/362 |
| 5,907,831 A | 5/1999 | Lotvin et al. | |
| 5,933,498 A | 8/1999 | Schneck et al. | |
| 5,970,231 A | 10/1999 | Crandall | |
| 5,972,875 A | 10/1999 | Crutcher et al. | |
| 5,974,446 A | 10/1999 | Sonnenreich et al. | |
| 5,987,606 A | 11/1999 | Cirasole et al. | |
| 6,020,884 A | 2/2000 | MacNaughton et al. | |
| 6,075,968 A | 6/2000 | Morris et al. | |

(Continued)

FOREIGN PATENT DOCUMENTS

FR 2814844 A1 10/2000

OTHER PUBLICATIONS

International Search Report from corresponding PCT application No. PCT/US09/43360, dated Jun. 8, 2009.

(Continued)

*Primary Examiner* — Robert J Utama
*Assistant Examiner* — Sadaruz Zaman
(74) *Attorney, Agent, or Firm* — Nelson Mullins Riley & Scarborough LLP (57) ABSTRACT

A system including an object-oriented programming language for building state-based applications with flow control, event loops, measures of similarity, and Boolean logic to dynamically control the interaction between members in a social network around content and, in particular, project-based activities, where the system collects and groups individuals who are members of a social network, projects or assignments and their content, and activities or processes within projects based on the attributes of the objects and runtime events to create a social context for learning or for other interaction.

21 Claims, 7 Drawing Sheets

(56) References Cited

U.S. PATENT DOCUMENTS

| | | | |
|---|---|---|---|
| 6,085,229 A | 7/2000 | Newman et al. | |
| 6,105,027 A | 8/2000 | Schneider et al. | |
| 6,157,924 A | 12/2000 | Austin | |
| 6,178,407 B1 | 1/2001 | Lotvin et al. | |
| 6,208,995 B1 | 3/2001 | Himmel et al. | |
| 6,233,618 B1 | 5/2001 | Shannon | |
| 6,249,282 B1 | 6/2001 | Sutcliffe et al. | |
| 6,279,013 B1 | 8/2001 | LaMarca et al. | |
| 6,296,487 B1 | 10/2001 | Lotecka | |
| 6,302,698 B1 | 10/2001 | Ziv-El | |
| 6,324,538 B1 | 11/2001 | Wesinger, Jr. et al. | |
| 6,341,960 B1 | 1/2002 | Frasson et al. | |
| 6,363,062 B1 | 3/2002 | Aaronson et al. | |
| 6,370,355 B1 | 4/2002 | Ceretta et al. | |
| 6,374,237 B1 | 4/2002 | Reese | |
| 6,381,444 B1 | 4/2002 | Aggarwal et al. | |
| 6,401,075 B1 | 6/2002 | Mason et al. | |
| 6,438,632 B1 | 8/2002 | Kikugawa | |
| 6,460,036 B1 | 10/2002 | Herz | |
| 6,470,353 B1 | 10/2002 | Yaung et al. | |
| 6,480,885 B1 | 11/2002 | Olivier | |
| 6,554,618 B1 | 4/2003 | Lockwood | |
| 6,560,578 B2 | 5/2003 | Eldering | |
| 6,658,415 B1 | 12/2003 | Brown et al. | |
| 6,684,212 B1 | 1/2004 | Day et al. | |
| 6,691,106 B1 | 2/2004 | Sathyanarayan | |
| 6,691,153 B1* | 2/2004 | Hanson et al. | 709/204 |
| 6,704,320 B1 | 3/2004 | Narvaez et al. | |
| 6,718,369 B1 | 4/2004 | Dutta | |
| 6,725,203 B1 | 4/2004 | Seet et al. | |
| 6,741,980 B1 | 5/2004 | Langseth et al. | |
| 6,757,691 B1 | 6/2004 | Welsh et al. | |
| 6,766,362 B1 | 7/2004 | Miyasaka et al. | |
| 6,807,558 B1 | 10/2004 | Hassett et al. | |
| 6,825,945 B1 | 11/2004 | Silverbrook et al. | |
| 6,826,534 B1 | 11/2004 | Gupta et al. | |
| 6,842,773 B1 | 1/2005 | Ralston et al. | |
| 6,845,273 B1 | 1/2005 | Taylor | |
| 6,892,226 B1 | 5/2005 | Tso et al. | |
| 6,920,617 B2 | 7/2005 | Nitta | |
| 6,954,783 B1 | 10/2005 | Bodwell et al. | |
| 6,973,462 B2 | 12/2005 | Dattero et al. | |
| 6,988,839 B1 | 1/2006 | Yu | |
| 7,031,651 B2 | 4/2006 | McCormick et al. | |
| 7,032,022 B1 | 4/2006 | Shanumgam et al. | |
| 7,035,926 B1 | 4/2006 | Cohen et al. | |
| 7,120,590 B1 | 10/2006 | Eisen et al. | |
| 7,127,741 B2 | 10/2006 | Bandini et al. | |
| 7,162,522 B2 | 1/2007 | Adar et al. | |
| 7,328,216 B2 | 2/2008 | Hofmann et al. | |
| 7,464,147 B1 | 12/2008 | Fakhouri et al. | |
| 7,577,665 B2 | 8/2009 | Ramer et al. | |
| 7,640,336 B1 | 12/2009 | Lu et al. | |
| 7,765,481 B2 | 7/2010 | Dixon et al. | |
| 8,055,663 B2* | 11/2011 | Tsai et al. | 707/749 |
| 2001/0037407 A1 | 11/2001 | Dragulev et al. | |
| 2002/0013836 A1 | 1/2002 | Friedman et al. | |
| 2002/0038246 A1 | 3/2002 | Nagaishi | |
| 2002/0040374 A1 | 4/2002 | Kent | |
| 2002/0049806 A1 | 4/2002 | Gatz et al. | |
| 2002/0064767 A1 | 5/2002 | McCormick et al. | |
| 2002/0100808 A1 | 8/2002 | Norwood et al. | |
| 2002/0119434 A1* | 8/2002 | Beams et al. | 434/322 |
| 2002/0123334 A1 | 9/2002 | Borger et al. | |
| 2002/0140732 A1 | 10/2002 | Tveskov | |
| 2002/0161770 A1 | 10/2002 | Shapiro et al. | |
| 2002/0169782 A1 | 11/2002 | Lehmann et al. | |
| 2002/0169954 A1 | 11/2002 | Bandini et al. | |
| 2002/0174230 A1 | 11/2002 | Gudorf et al. | |
| 2002/0184092 A1 | 12/2002 | Cherry et al. | |
| 2003/0029911 A1 | 2/2003 | Kitayama | |
| 2003/0050986 A1 | 3/2003 | Matthews et al. | |
| 2003/0093518 A1 | 5/2003 | Hiraga | |
| 2003/0110215 A1 | 6/2003 | Joao | |
| 2003/0164849 A1 | 9/2003 | Barrie et al. | |
| 2003/0207245 A1 | 11/2003 | Parker | |
| 2004/0001087 A1 | 1/2004 | Warmus et al. | |
| 2004/0014017 A1* | 1/2004 | Lo | 434/322 |
| 2004/0030781 A1 | 2/2004 | Etesse et al. | |
| 2004/0039814 A1 | 2/2004 | Crabtree et al. | |
| 2004/0049554 A1 | 3/2004 | Watanabe | |
| 2004/0064515 A1 | 4/2004 | Hockey | |
| 2004/0103118 A1 | 5/2004 | Irving et al. | |
| 2004/0103122 A1 | 5/2004 | Irving et al. | |
| 2004/0103137 A1 | 5/2004 | Irving et al. | |
| 2004/0111423 A1 | 6/2004 | Irving et al. | |
| 2004/0122692 A1 | 6/2004 | Irving et al. | |
| 2004/0128624 A1 | 7/2004 | Arellano et al. | |
| 2004/0145770 A1 | 7/2004 | Nakano et al. | |
| 2004/0167794 A1 | 8/2004 | Shostack et al. | |
| 2004/0186738 A1 | 9/2004 | Reisman | |
| 2004/0205578 A1 | 10/2004 | Wolff et al. | |
| 2005/0014121 A1* | 1/2005 | Eck et al. | 434/350 |
| 2005/0014122 A1 | 1/2005 | Ruvinsky et al. | |
| 2005/0079477 A1 | 4/2005 | Diesel et al. | |
| 2005/0227216 A1* | 10/2005 | Gupta | 434/322 |
| 2006/0134593 A1 | 6/2006 | Kalous et al. | |
| 2006/0240856 A1 | 10/2006 | Nicholas et al. | |
| 2007/0130339 A1 | 6/2007 | Alcorn et al. | |
| 2007/0192299 A1* | 8/2007 | Zuckerberg et al. | 707/3 |
| 2007/0224585 A1* | 9/2007 | Gerteis et al. | 434/350 |
| 2007/0231782 A1* | 10/2007 | Ozawa et al. | 434/350 |
| 2008/0126476 A1* | 5/2008 | Nicholas et al. | 709/203 |
| 2011/0153740 A1* | 6/2011 | Smith et al. | 709/204 |

OTHER PUBLICATIONS

Written Opinion from corresponding PCT application No. PCT/US09/43360, dated Jun. 8, 2009.

United States Patent and Trademark Office, Non-Final Office Action, mailed Mar. 2, 2012, U.S. Appl. No. 13/251,263, filed Oct. 2, 2011, Linda T. Dozier et al.

United States Patent and Trademark Office, Non-Final Office Action, mailed Apr. 17, 2012, U.S. Appl. No. 11/402,830, filed Apr. 13, 2006, Osmani Gomez et al.

* cited by examiner

FIG. 1

FIG. 2 ePals
WHERE LEARNERS CONNECT

Home  Back  Logout

Users  Orders  Products  Emails  eMentoring  Status  Groups  Reporting
Locations  Series  Topics  Resources  State Clock  Instances Current Location: In2Books [Pick a sub-location ▼]
Location Search: [______] [Search] (min. 3 letters)
Grade Taught [N/A ▼] [Save]
Update Location Name: [In2Books______] ☐ Is Title I [Update Location] — Hierarchical content
View Location Users View Matches
Available Series: [Geography ▼] [Attach Series] — Association with Participants

| Series | Date Created | Status | Date Modified |
|---|---|---|---|
| Edit Summer Pilot 08 | 7/1/2008 12:14:13 PM | Active | 10/11/2008 2:47:16 PM |
| Edit The Way We Are | 10/16/2008 2:10:15 PM | InActive | 10/16/2008 2:11:03 PM |

Association with Project

New Location
Location Name: [______]
Location Type: [Other ▼]
[Create Location]

© 2009 ePals Inc. All rights reserved. ePals, In2Books, ePals and other related logos and trademarks appearing on the site are trademarks of ePals, Inc.

FIG. 3 ePals — WHERE LEARNERS CONNECT

Home   Back   Logout

Users   Orders   Products   Emails   eMentoring   Status   Groups   Reporting
Locations   Series   Topics   Resources   State Clock   Instances In2Books Topic Taxonomy > Fiction > Bullies
Update Current Name: [Bullies]   [Update]

| Name | Location | Remove | MoveTopic |
|---|---|---|---|
| ☐ Agnes Parker: Girl in Progress | In2Books | [Delete] | Move Project |
| ☐ Donuthead | In2Books | [Delete] | Move Project |
| ☐ Dork on the Run | In2Books | [Delete] | Move Project |
| ☐ Jake Drake: Bully Buster | In2Books | [Delete] | Move Project |
| ☐ Secret Identity Shredderman | In2Books | [Delete] | Move Project |
| ☐ The Misfits | In2Books | [Delete] | Move Project |

Create a new topic
Name:
Description:
Abstract:
[Cancel] [Create]

Create a new project
Name:
Description:
Abstract:
[Cancel] [Create]

© 2009 ePals Inc. All rights reserved. ePals, In2Books, ePals and other related logos and trademarks appearing on the site are trademarks of ePals, Inc.

000
OBJECT-BASED SYSTEM AND LANGUAGE FOR DYNAMIC DATA OR NETWORK INTERACTION INCLUDING LEARNING MANAGEMENT

CLAIM OF PRIORITY

The present application claims the benefit of the United States provisional patent application filed on May 8, 2008 by Dozier et al. for OBJECT-BASED SYSTEM AND LANGUAGE FOR DYNAMIC DATA OR NETWORK INTERACTION INCLUDING LEARNING MANAGEMENT (Ser. No. 61/051,673), the entire disclosure of which is incorporated by reference as if set forth verbatim herein.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright whatsoever.

FIELD OF THE INVENTION

The present invention relates generally to an online interaction system and, more particularly, to an online educational system.

BACKGROUND OF THE INVENTION

Network or Internet-enabled environments and, more particularly, social networking systems, generally allow users to interact online with respect to various topics and categories of information. These systems set, generally speaking, static permissions and rights for each user that define how the user interacts with the system and other users. A user may join one or more groups of users formed within the system, where the user is then defined as being a part of the group(s). One particular use of such an environment in a market such as education involves the definition of "courses" that have content objects, permissions and rights, and specified execution logic whereby a user progresses through a series of interactions and events online as mediated by these predefined permissions, rights, or execution flows.

In the instance of user groups, interaction among users and/or groups is typically facilitated through various mediums, such as blogs, posts, and discussion/message boards. Data representative of this interaction is typically stored in a data structure corresponding to the forum in which the interaction took place. For example, data representative of posts or other material uploaded by a user to a discussion board directed to a specific topic is stored in a data structure corresponding to the discussion board, such as a thread. The data is not stored in a data structure corresponding to the user who posted or uploaded the material. This arrangement prevents a user from maintaining a collection of all interactions of that user, as well as all information and material posted or uploaded by that user, in one location. Accordingly, the user is unable to transport or transfer the collection to another system or to another group within the same system. The user is also unable to easily locate and retrieve information or material already provided by the user to the system in some manner or form from one location or storage medium.

Users may also form relationships or associations with other users. These relationships are usually static meaning that there is merely an identification that a first user is connected to a second user where the system is unconcerned with the manner and reason for the connection. The connection between the users also lacks context such that the first user may receive a notification that the second user has performed an action with respect to a specific category of information even if the first user is not concerned with that category. When the second user performs another action (but with respect to a specific category in which the first user is interested), the first user merely receives the same notification as that corresponding to the category in which the first user is not interested. The first user is not alerted as to the importance or significance of the second action.

Such systems may also provide or offer an application programming interface ("API") allowing users to interact with the system or to create subprograms using the system's functionality. The user can then interact with the system using the subprograms, which the user may offer (or may offer the functions provided by the subprogram) to other users. The subprograms functionality is limited, however, by the set of functions and methods provided by the system in the API. For instance, the user lacks the ability to define objects, functions, methods, events, and other functionality to use within the system.

It is also generally understood that social network-based computing and information architectures and learning management system computing and information architectures have traditionally been at opposite ends of a continuum, sharing very few core assumptions, characteristics, and capabilities. In some relatively recent instances Learning Management Systems that have been very "closed," have started to be extended to become more modern, open, and Internet capable. Two background sources for information include U.S. Pat. Nos. 6,519,629 and 7,493,396 and U.S. Published Patent Application Serial Nos. 2007/0192299 and 2004/0181751, to which reference is made, and the disclosures of which are each incorporated by reference as if set forth verbatim herein.

SUMMARY OF THE INVENTION

The present invention relates generally to constructing context-aware content and application objects that can be executed in a runtime environment as part of a larger project or sequence. This includes the ability for programmers to create, assign, and construct objects to which rules have been associated that make distinctions in, for example, execution paths or consequent events depending upon assertions or assessments of factors relating to state (such as time or the occurrence or nonoccurrence of specified events), roles, and other factors that may be assessed at runtime. The present invention finds particular utility in projects, courses, and other routines that contain a regimen, flow, or pedagogy where object modules build on each other in a definable manner subject to automation using computers and networks. In the education field, for example, practitioners may refer to systems that accomplish one or more of these objectives as Learning Management Systems and "distance learning," where adaptive content or related concepts may be an outcome or result. In such a context, the present invention relates to an object-based system and language for dynamic data or network interaction in a learning management system.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 3 through 7 are portions of an exemplary user interface that may utilize the exemplary process of FIG. 2 and may be utilized by the system of FIG. 1.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
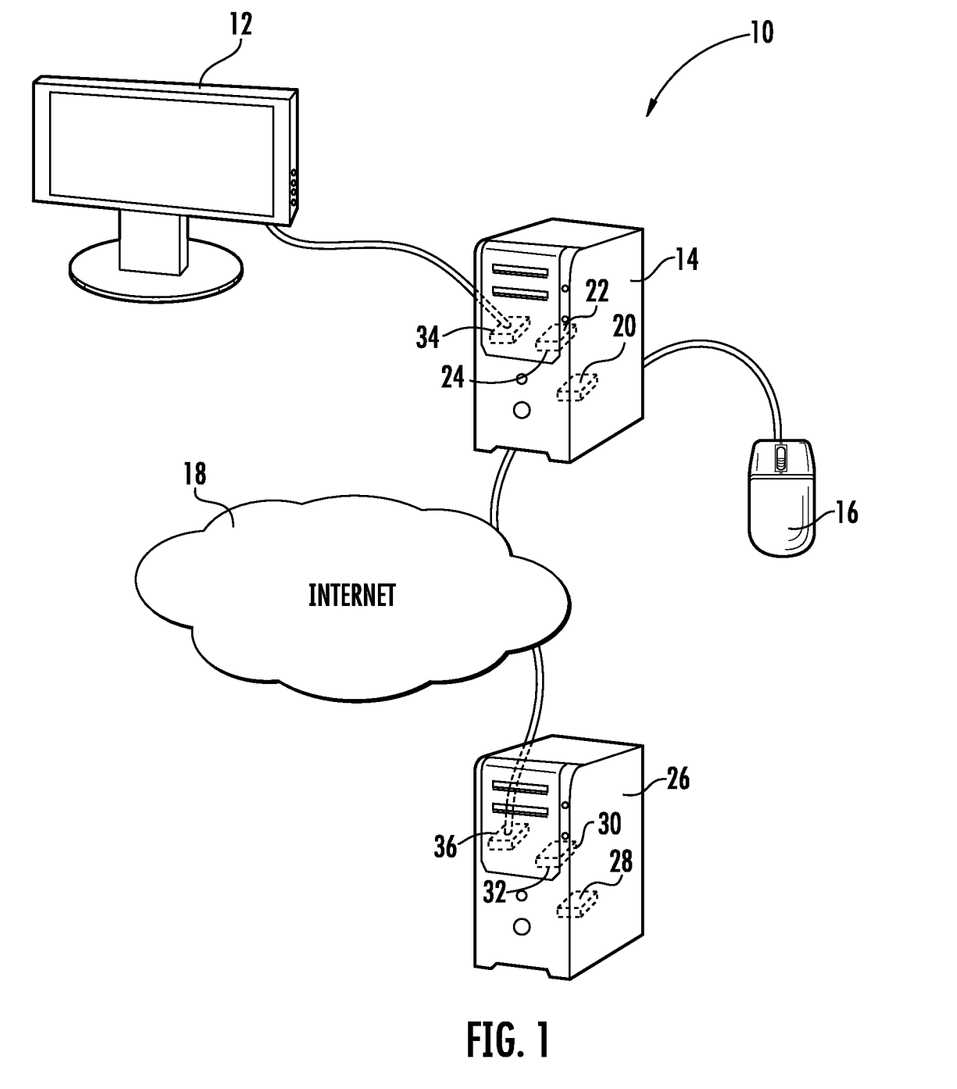
FIG. 1 is a schematic representation of a learning management system in accordance with an embodiment of the present invention.

FIG. 1 illustrates a learning management system 10 in accordance with an embodiment of the present invention. Referring to FIG. 1, system 10 includes a display 12, a computer 14, and an input device, such as a mouse 16 or a keyboard. Computer 14 may be connected to a local or distributed network, such as the Internet 18, and comprises a processing device 20 and memory 22. System 10 may also include additional computers connected to the Internet 18, such as server 26, which includes its own processing device 28 and memory 30 that may include one or more databases 32. Computer 14 and server 26 are operatively connected to Internet 18 via respective network interfaces 34 and 36. Network interfaces 34 and 36 may be either a wired or a wireless connection. In the case of a wireless connection, it should be understood that connections 34 and 36 may be any wireless protocol or technology capable of interconnecting two or more terminals, such as Bluetooth, wireless fidelity ("Wi-Fi"), or a cellular data network.

Processing devices 20 and 28 may be printed circuit boards, processors, microprocessors, controllers, microcontrollers, or a combination thereof. Each of memory 22 and 30 may be any memory or computer-readable medium as long as it is capable of being accessed by processing devices 20 and 28, respectively, including random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Additionally, when information is transferred or provided over a network or connection, such as via network interfaces 34 and 36, the receiving device, such as processing devices 20 and 28, recognizes the connection as computer-readable medium. Such a connection should therefore be included in the definition of memory 22 and 30.

Memory 22 and 30 comprise computer-executable program code or instructions that when executed by respective processing devices 20 and 28 perform one or more steps of the processes described in more detail below. Memory 22 and 30 may also comprise data and one or more data structures or databases for storing information. The computer-executable program code or instructions, as should be known to those skilled in the art, usually includes an operating system, one or more application programs, other program modules, and program data.

In a preferred embodiment, memory 30 includes program code that when executed by processing device 28 hosts a learning management website. Hosting a website should be understood by those of ordinary skill in the art and is therefore not described in more detail. Memory 22 includes program code that when executed by processing device 20 provides a web browser, as should also be understood. A user of computer 14 directs the web browser to the website hosted by server 26. At this point, server 26 transfers a portion of the program code stored on memory 30 to memory 22 of computer 14 via network interfaces 34 and 36 and Internet 18. In the presently described embodiment, the program code is written in the hypertext markup language ("HTML"), but it should be understood by those of ordinary skill in the art that the program code may be written in other languages including other scripting languages, such as PHP or Perl, or other markup languages, such as extensible markup language ("XML"), as well as on other platforms such as the .NET Platform provided by MICROSOFT CORPORATION of Redmond, Wash. In this embodiment, the program code is transmitted via the hypertext transfer protocol ("HTTP"). As computer 14 receives the program code transmitted by server 26 and stores it on memory 22, processing device 20 causes the web browser or program to interpret the transmitted code and render the resulting webpage on display 12. The resulting webpage presented by display 12 is a user interface utilized by the user to interact with system 10 and, particularly, the website hosted by server 26.

While the preferred embodiment described above contemplates the interaction of server 26 and computer 14, those of ordinary skill in the art will appreciate that a user may access the website maintained by server 26 directly from the server. Those of ordinary skill in the art will also appreciate that other users may access the website from other computers connected to Internet 18 in a manner similar to that described above with respect to computer 14. System 10 provides each user who accesses the website with a unique username or identification ("id"), as should be understood by those of ordinary skill in the art. The webpages transmitted by server 26 and rendered on display 12 as described above are equivalent to a graphical user interface ("GUI"). The GUI presented to each user via display 12 is based on that user's id and therefore unique to that user.

One embodiment of the present invention provides an object-oriented programming language for building state-based applications with flow control, event loops, measures of similarity, and Boolean logic to dynamically control the interaction between members in a social network around content and, in particular, project-based activities. This embodiment dynamically collects and groups individuals who are members of a social network, projects or assignments and their content, and activities or processes within projects based on the attributes of the objects and runtime events to create a social context for learning or for other interaction. In this context, "learning" may be broadly defined, and may refer to standard curricular subjects, such as social studies or science, may refer to learning to use an online game or partake in an activity, or may refer to cultural learning, such as with respect to music or languages.

The present invention uses statements in a high-level, object-oriented programming language where a sequence of objects and their attributes can be defined and created and the language is used to define states, their attributes, behaviors, and metadata. Objects can be grouped and related to each other to define a project or learning unit that executes in a "runtime" environment that is accessible programmatically or by users from within or even outside of the runtime environment. That is, because persistent state is retained for objects, the state of a project that is associated with a user can be accessed when the project is not actively executing in the runtime environment from outside of the runtime environment, and can also be accessed from outside the runtime environment while the project is executing. In a preferred embodiment, the runtime environment instantiates objects and executes the objects forming projects, but wherein the set of instructional logic associated with the objects to be acted upon at runtime are capabilities that constitute the runtime environment that are distinct from the capabilities that are defined by the project and/or its objects. The programming of a project (a set of objects, attributes, and behaviors) is independent of the runtime environment that executes the program. Programs can be created, stored, transmitted, and updated independent from the runtime environment. The runtime environment can be revised and distributed independently from the programs that execute within it.

This state instantiated metaclass object node environment language comprises an instruction set associated with objects, events, and rules that can be used by a variety of applications to develop user experiences that are highly customized with respect to content, social groupings, and activities. Instruction sets may specify event-driven rules based on actions from within the runtime environment or from outside of the runtime environment. That is, a project executing on behalf of one user may access and modify the state of the object of another user who is not currently instantiated. Objects that retain persistent state are instantiated at runtime and the data are used to determine the behavior of the applications. Once states are instantiated for a user, they are encoded in a form suitable for access during processing of runtime events.

A first class object in the language is a "state," which is an event loop object—an object that continuously processes input. In all other programming languages, a loop is a procedural programming construct (e.g., "from I to n" or "do-while true" loops) rather than an object. Because states are objects, they can have variables and actions and can be modified at runtime. States (i.e., an event loop) can have attributes, which are its rules. The rules may react differently to different inputs (i.e., events or commands) on an individual basis according to the current instantiation of class variables.

For example, there could be a state "weather" with the rules "cold" and "snowy." The state object is an event loop that is waiting to receive input. An event ChangeSeason( ) is sent to the "weather" state, and the rules (i.e., the attributes of the state) are currently "cold" and "snowy." The rules for cold and snowy upon a ChangeSeason( ) event, change the rule to "warm" and "sunny." The state continues to persist in the runtime environment and waits to receive additional events. When the weather state receives the exact same ChangeSeason( ) event again, the state behaves differently even though the input is the same, this time setting itself to "hot" and "buggy" based on the current instantion of the event variables and its attributes.

Thus, a stateful language for defining dynamic data and social network interaction is based on classes of objects with associated variables and actions. Objects i) retain state, ii) reference other objects, and iii) receive events from users, programs, or objects that trigger behavior based on the attributes of the object (i.e., the rules). First class objects include, but are not limited to, state, member, role, topic, resource, match, location, and assignment. A program could define a learning process where state objects are associated with a member and role that progresses from state-to-state, thereby dynamically driving presentation of content and functional capabilities from basic knowledge of a topic to mastery. When a user executes a program in the runtime environment, the current values of all of their objects are loaded into the runtime environment. The runtime environment listens for events, and, upon seeing an event, a message is sent to the user's instatiation of objects. The objects interpret the event based on the current state of their rules (i.e., attributes), and then modify the attributes of related objects. The current values of object attributes are used by project programs to determine the content and social groups that are presented to the user. Programs query the current learning state and use the state information to dynamically retrieve currently relevant content altering the user's experience, which may include adding the user as a member of an immediately relevant social group, removing the user from other groups, and/or enabling the functionality of applications (e.g., make a level visible in a game or enable a button on an application that was previously disabled or "grayed out").

Because events and rules are also objects, they can be modified at runtime. For example, an event could trigger the update of a rule associated with itself. Programs and/or programmers can modify objects, including events and rules, but the runtime environment that interprets events and determines where to send events cannot be modified at runtime. It should be understood that the specification of rules, constraints, instructional logic, etc. associated with an object can be associated directly with an object or can be indirectly associated with it. For example, where the object has associated with it a pointer that, when triggered, locates the appropriate instruction logic or other data (and may ascertain one or more conditions or assertions concerning the object or the context in which the object is being evaluated [e.g., the time of data, the nature of the other objects in a sequence, attributes of the user triggering the sequence, etc.]), so that, for example, the objects themselves need not be "republished" or reissued in instances where it is desired for one or more aspects of the instructional data with respect to them to be updated or to change in some manner. Many software licenses, as well as copyright law, give a copyright owner the right to make backup copies to protect against catastrophic failure of equipment. However, the making of uncontrolled backup copies of the runtime environment is inherently at odds with the ability to control usage and behavior, since an uncontrolled backup copy can be kept and then restored even after the authorized copy was sold or discontinued.

A curriculum unit is a programmed set of objects that define a learning sequence, and each instantiation reflects the state of a learner and, given various states, determines how content, activities, and social groups should be presented to the user. The language may include metadata about objects, instructional logic, and/or semantics. In the context of the language's use in online learning, it is used to create series of learning units. Specific examples of a "learning unit" are:

1. A collection of projects that relate to creating a social network for learning the English language and grammar, as well as for dynamically creating communities of users that practice learning language skills together.

2. A collection of projects that are to be performed in a sequence that describes the scientific process, such as forming a hypothesis, collecting data, analyzing data, and reaching a conclusion. Each participant in the project may have a different role as it relates to the sequence of states that defines the process of scientific inquiry.

3. A process-based literacy learning curriculum where a project is associated with a particular genre of study, such as fiction, social studies, biographies, folk tales, or science. Project activities may include reading a book, discussing content in the book in a small group and/or a large group, and then having one set of participants write about the book. Another set of participants read the materials written by the first set and then respond to them. The cycle then repeats.

4. In mathematics, a learning unit may be a chapter on addition and include interactive games to create sums. An object could accept sums and, upon receipt of each sum, update itself to present more or less complex problems. Another attribute (or rule) of the learning start could be to make the user a member of a high-participation group after submission of a predetermined number of answers. The membership object, upon seeing an "AddMember" event, could cause the attribute (rule) to notify current members that a new member is now part of their group. If the user does not continue to participate at the user's previous level, the membership state could have an attribute that defines the rules for removing members as well. Unlike other systems, the runtime environment combined with persistent stateful objects and logic determines in real-time the social context of the user.

Associated with the procedural programming language are measures of "similarity" between objects in the same class or objects in different classes. In this sense, the measures of similarity go beyond the normal constructs of typical procedural languages. Generally, procedural languages include concepts of equal, not equal, greater than, contains, between, etc., syntax rules, and flow control. In the language described herein, the idea of similarity is based on the concept of a multi-dimensional distance between objects. A set of comparisons among a group of participants, for example, would enable clustering of subgroups based on one or more similarities with respect to some specifically-defined criteria, such as degrees of semantic similarity in the subject matter of their projects, level of mastery, measure of activity, current state, state within a project, etc. Similarities in this context and clustering based on similarities are described in more detail in copending U.S. patent application Ser. Nos. 11/937, 495, 11/937,497, and 11/937,499, which are incorporated by reference in their entirety as if set forth verbatim herein. Other relevant information may be found in copending U.S. patent application Ser. Nos. 12/105,254, 11/402,830, 11/402,829, 10/619,259, 10/619,101, 10/619,099, and 10/619,097, which are incorporated by reference in their entirety as if set forth verbatim herein.

Relation to an Object-Based System

An object-based system, such as a curriculum unit, contains a specification of the content that is part of the system and the relationships between the content. The object-based system may also contain information relating to the content, such as descriptions of the users of the data, their roles and relationships with respect to one another, and, in the case of curriculum units or other regimens that progress in some anticipated or planned manner, may also specify the states or activities in which the users will engage as part of that curriculum unit. The object-based system also can contain, as appropriate for the circumstances, procedural logic, flow control, and outflow control, as well as Boolean logic, along with rules that express how the people (e.g., participants in a social learning network) may or should interact with each other and elements of content around, for example, a curriculum unit. It is preferable that an object-based system contain the rules and/or constraints for dynamically creating a social context within a learning network, such as a social network for collaborative projects that are conducted around subject matter. The content and various user roles, states, rules, and events that may be associated with it form an instruction set for how the collection of objects will interact with each other in the context of a runtime environment.

Although one skilled in the art would understand how these component pieces can be assembled as desired for specific outcomes related to interactions with content objects, for example, bringing "stateful" processes to such objects, in one preferred embodiment, an object-based system for authoring curriculum units is programmed through the following process as described in more detail below with respect to FIG. 2: (a) Create the curriculum unit, which may be a container of a collection of projects; (b) Create the project; (c) Define the 1 to Na objects to include in the project. Objects may be retrieved from a repository of predefined objects and reused in multiple projects. Defining the objects that form a curriculum unit includes identifying the users, content, and states (i.e., activities); (d) Define the events that the objects should recognize forming the activity structure for the curriculum unit; (e) Define the rules as desired for each object; that is, the rules associated with each event for each object forming an instruction set for the object. When the object receives the event, the associated rule is executed, forming, in toto, a learning sequence or pedagogical logic of the curriculum unit; (f) Identify the user objects associated with the unit or component parts; (g) Define the role-specific rules applicable for activity(ies)/state(s); (h) Set any time-based rules associated with the states and the actions associated with meeting or exceeding the desired time constraint; (i) Associate content or subject matter with desired state(s); (j) Select metadata for users, content, and states; (k) Specify rules, events, and/or roles associated with content objects that determine what content to display to participants; (l) Specify rules or constraints on user or role objects as desired that determine how participants should be grouped for an activity; (m) Specify rules or constraints on role objects that determine the conditions under which states are available to participants; (n) Publish the object-based system where the definition of the collection of objects (e.g., the curriculum unit), the content and data, and the objects and their associated instruction set (rules and events) are stored (preferably individually for efficiency and re-use) for later retrieval and execution in a runtime environment, and, in this example, preferably embedded in a learning platform. The published system is instantiated and executed according to authored commands, preferably by an individual user or program that has been initiated by a user.

It may also be desirable for an object-based system to contain a description of the types of participants who can or will interact around the project and activities in the curriculum unit in some manner, preferably according to a selected role. The specification of the people may include identifying specific individuals, categories to which the people belong and potentially people associated (for example in a social network with—such as students in a class). In the presently-described embodiment, the specification identifies the different types of users that will interact with the content, because the rules and the events then become specific to the role of the user. Examples of the user roles in the context of a learning environment include a teacher, a teacher's aide, a mentor, a student, or a parent. Users are preferably coupled with, but logically separate from, role objects (to permit, for example, multiple roles depending on context, changing of roles, re-use of roles across multiple units, etc.), and users may be associated with multiple roles. A rule associated with a state can modify the roles for a user. For example, the state "participation" could receive an event to AddReplies(n), and that event could have a rule where if a threshold value is exceeded then the AddRole("expert") event is sent to the role object. User's roles are specific to the instantiation of an object-based system rather than the user. Thus a user could be a student in one context and a teacher in another.

An object-based system of the present invention can maintain persistent state, as desired, of all of the objects logically associated in a system (e.g., in a curriculum unit) for each user that instantiates the unit in the runtime environment of, for example, the learning platform. When a user takes an action that starts the curriculum unit—such as signing on and selecting the unit—the attribute settings for each object retrieved for that user are, preferably, retrieved from a persistent store and loaded into the runtime environment. Flexibility is achieved when individual users are logically separate from the definition of an object-based system, but become operatively coupled to the system at runtime via persistent user-level state attributes.

The runtime environment of the platform—such as a learning platform—receives a request to load one or more objects per curriculum unit. The definition of the curriculum unit or an object is retrieved from the object-based system and based on that definition, the system can retrieve the current values of each rule for the user, each of which can be defined in the context of the curriculum unit from a secure, persistent store. Objects are preferably stored and retrieved independently, that is, in the context of the present invention, a curriculum unit may be comprised of a set of loosely coupled objects stored in a repository rather than compiled into a file.

The object-based system includes means for specifying attributes that should be maintained about both the content as well as the people who are (or have been) (or are associated in some manner, such as social network based relationships or groups with a person) engaged in a curriculum unit. For example, there exists a curriculum unit entitled the In2Books Classroom Science Series, whose definition specifies that the system should maintain the user's age, gender, and books read. The attributes of a user object can vary based on role. The set of teacher attributes may be school, grades taught, and average time spent for their students to read and write about a book. The specification of the attributes to maintain for the curriculum unit may include the weighting used to measure similarity and to conduct a search based on similarity. The weights may be based on the particular goal of the comparison. For example, if the state is "book selection," the age range and the books that have already been read might be weighted more heavily than the cycle time that it takes to read and write about the book. In contrast, if the described state is to match two people, the cycle times might be more heavily weighted to match people who are inclined to write at a similar pace. The object-based system also allows definition of attributes that are role-based, may be tracked for a user, and provides the capability per state (or for desired states) to weight the attributes differently, depending on the intended objective.

The attributes about users (and individual users) that are maintained by the object-based system can be used to dynamically adapt content, people (e.g., in a social network) and functionality presented or made available to a user and/or others with a relationship of some kind with the user. For example, "book selection" might be presented just to the students who have "sent letter". After the student selected a book (OrderBook("title") event), the content presented to users in their collaborative work group would be changed to reflect the topic of the book and role-specific assignments. A unique aspect of this definition of a unit is that projects can be defined whereby the actions of one or more users (e.g., a student) changes the object attributes of one or more other users (e.g., mentor). One of the rules associated with the BookOrder event could be to set the CurrentTitle attribute of the mentor's Assignment object. The Current Title attribute setting could be read by a content management system and used to determine what home page content to display to the mentor. Similarly, the actions of the mentor could, for example, determine the content and capabilities available to their corresponding student by changing the current attributes of the student.

The existence of an association between two users or groups of users can also affect the attributes associated with a user. The relationship between users can be explicit, inferred or federated between systems. An example is where a Parent-Child (user a, user c) relationship exists between user a and user c, and a ParentChild(user d, user c) relationship is added for user d with the same parent user ID then a rule executes inferring the relationship of Sibling(user a, user d) between users a and d. If user e is added with a ParentParent(user c, user e) relationship and user e may have the attribute "father", then a rule could execute that adds a ParentChild relationship between user e and users a and d. The association data between users could be stored on different systems.

Creation of a Curriculum Unit as an Example of an Object-Based System

Figure 2:
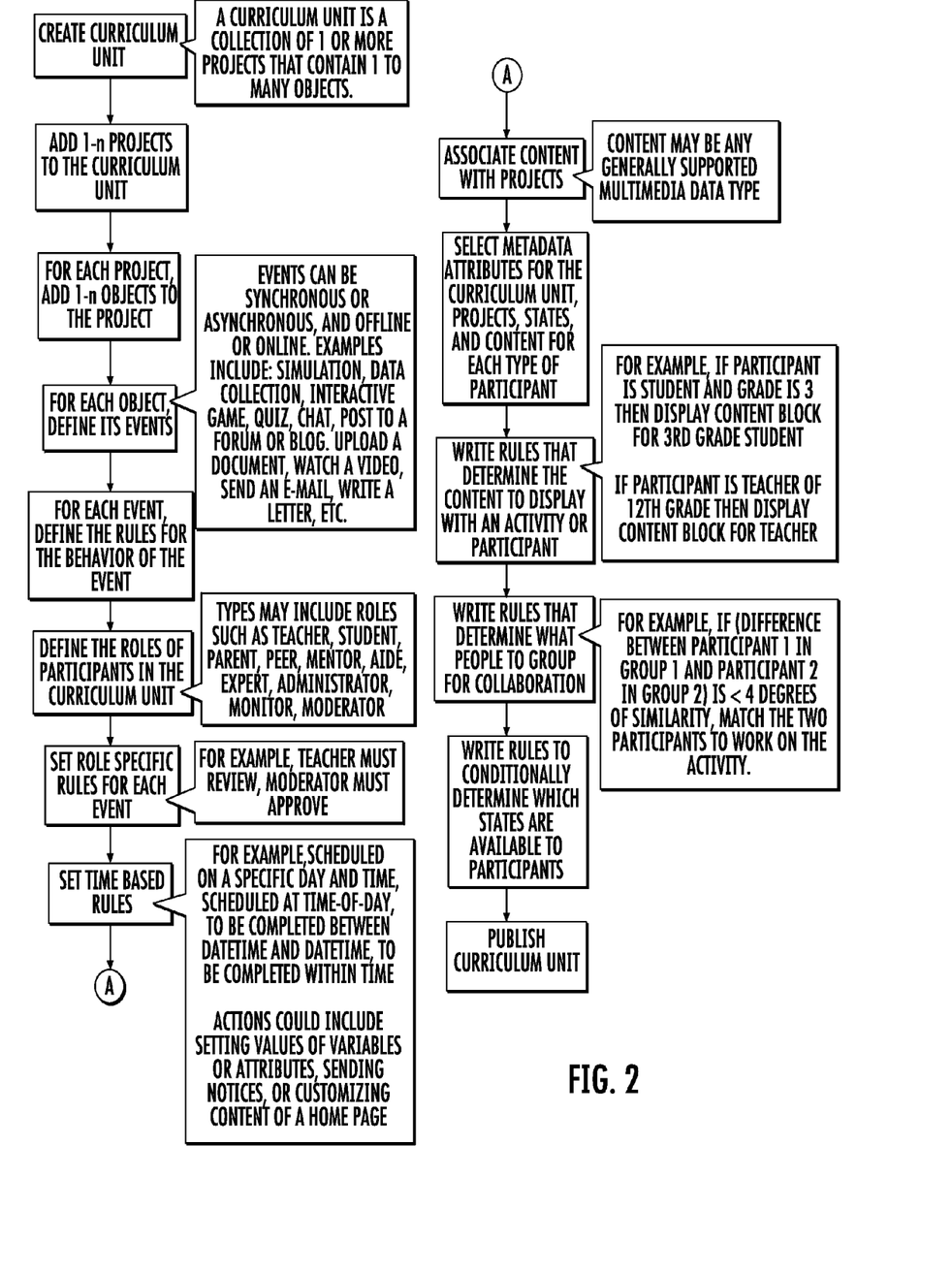
FIG. 2 is a flowchart of an exemplary process for an object-based system and language for dynamic data or network interaction including learning management that may be utilized by the system of FIG. 1.
Figure 3:
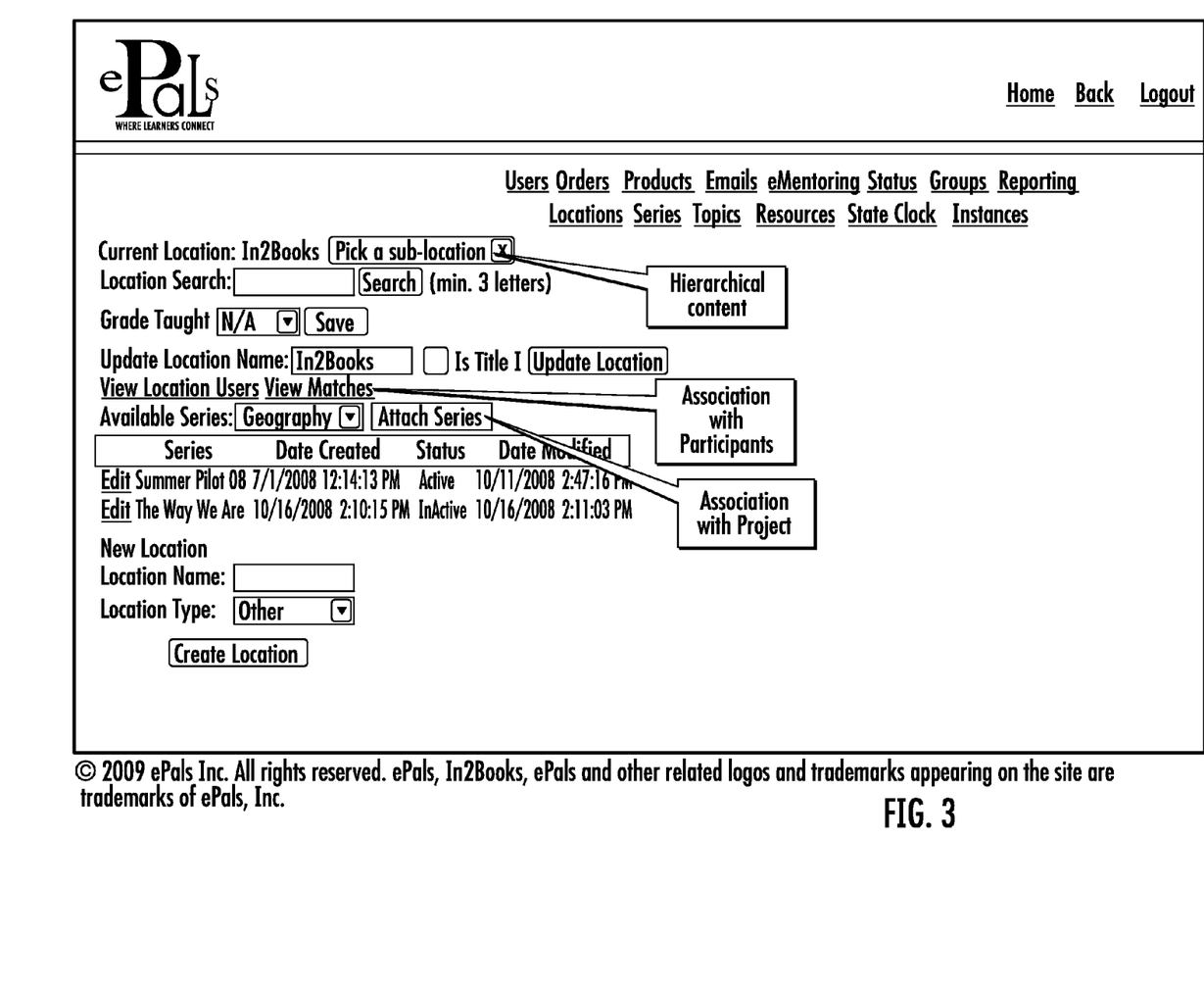
Figure 4:
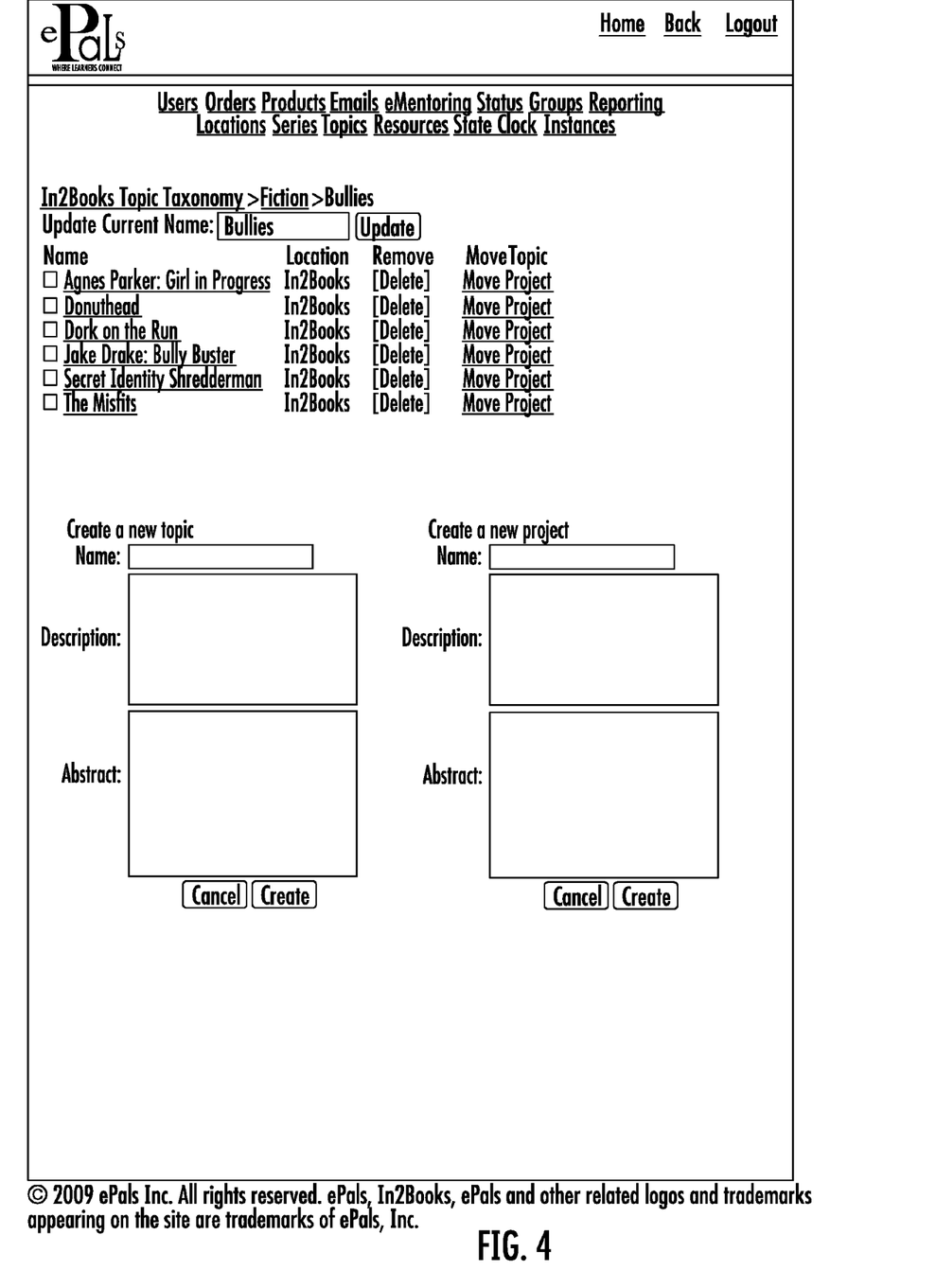
Figure 5:
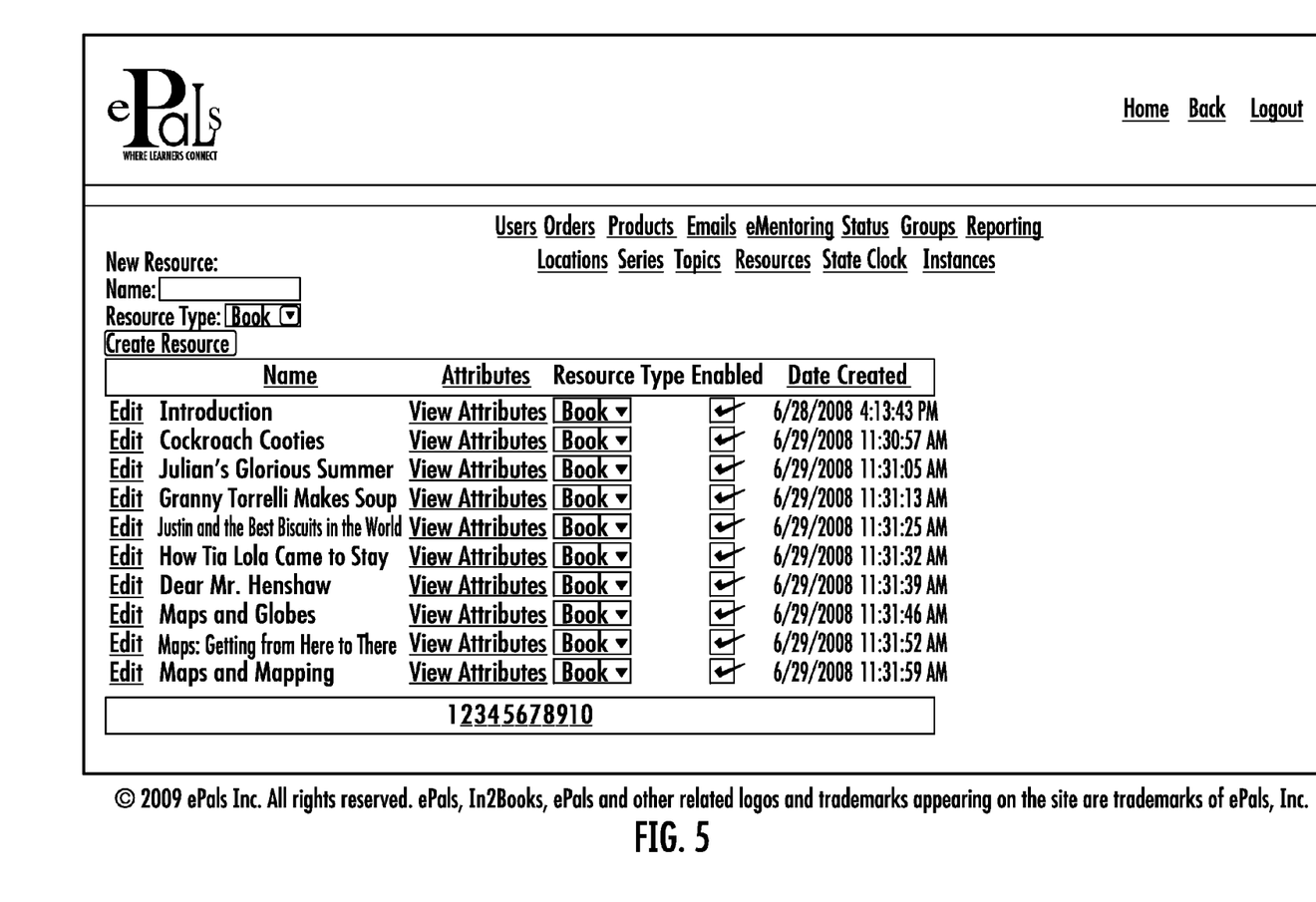
Figure 6:
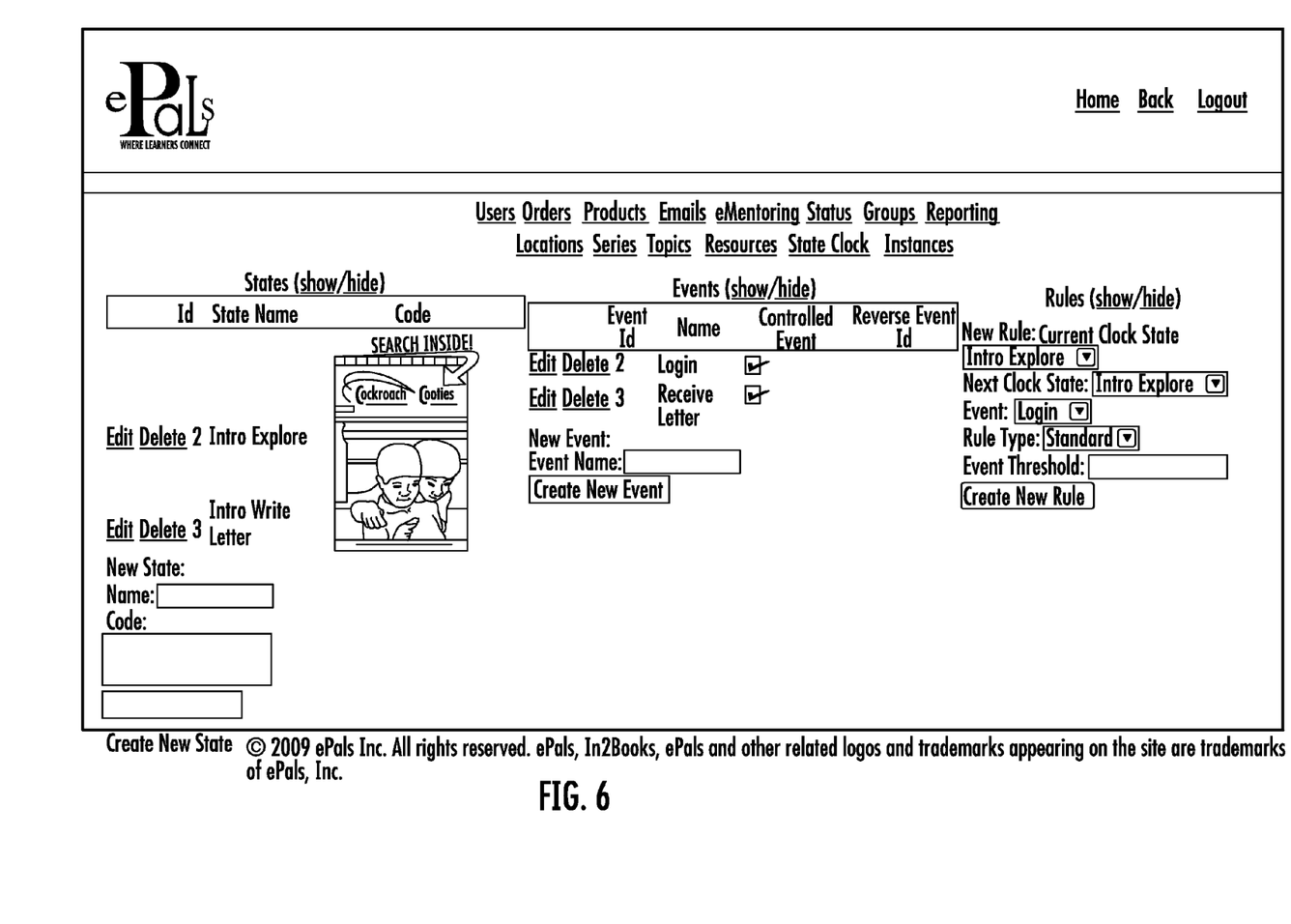

Referring to FIG. 2, the following steps outline the sequence to create a curriculum unit in one embodiment of the present invention:

Create curriculum unit with descriptive title.
   The basic curriculum unit has 1 to Np projects. Each project has 1 to Na objects that include learning activities. For example, a curriculum unit may be called "In2Books classroom unit."
Set the global properties of the curriculum unit.
   Examples of global properties are prerequisites required for the curriculum, required or optional time-bound specifications, and sequences to be followed.
Add 1 to Np projects to the curriculum unit.
   The first project is an introductory project. The rules may be for mentors to submit their introductions within a specific time interval. Teachers may have a rule associated with that state causing the teacher to be responsible for that state and requiring the teacher to review and approve the mentor's introduction. The student may then have a state that requires that the student open and read the letter. The above are exemplary states related to writing an introductory letter, and how the mentor (or pen pal), the teacher, and the student have role-based rules that are associated with events.
For each project, add 1 to Na states.
   Continuing the present example, the first state in the curriculum is for the mentor to write an introductory letter to their student. The state for the teacher is to review letters, and the state for the student is to read letter.

For each state, determine its events.
An example of the events for the "WriteIntroductoryLetter" state are SaveDraft( ) and SubmitLetter( ). The events for ReviewLetter are Approve( ) and Revise( ). The event for ReadLetter is Open( ). Events may be synchronous or asynchronous.

For each event, define its rule.
Rules are conditional clauses that are checked when an event is sent to a state. Meeting a rule causes events to be sent to objects. Rules can be role-based. For example, state could be to review a letter before it is posted to a website, blog, or another participant, and a rule of that state is that it is restricted to those who have the role of a teacher. The review state may have a "moderate" event which is specific to the role of teacher or moderator. Rules associated with events may also relate to time. For example, the SubmitLetter( ) event may have a rule that it must occur within two weeks of reaching the WriteIntroductoryLetter state.

The rule associated with the SubmitLetter event could be that duration of the state is less than or equal to two weeks of reaching the WriteIntroductoryLetter state. The rule associated with ApproveLetter event could be that the length of the letter must exceed 300 words, and the rule associated with the ReadLetter event could be that the letter must remain open for 30 seconds.

Define the roles of participants in the curriculum unit.
An object-based system may contain descriptions of the types of participants who will interact around the project and activities and in the curriculum unit. The specification of the people may include identifying specific individuals and their roles. In the presently-described embodiment, the specification identifies the different roles of users that will interact with the content, because the rules then become specific to the user role. Examples of the user roles involved in the curriculum being described in this example are teacher, student and mentor. In the In2Books curriculum example being described, the WriteIntroductoryLetter and ReadLetter states are associated with both the student and mentor roles whereas the ApproveLetter state is only associated with the teacher.

Define events to trigger, depending on whether the condition of a rule is met.
Examples of such actions include setting values of variables or attributes, sending notices, customizing the content of a home page or even changing downstream rules and events that may be applicable to objects that, in toto, comprise the entire unit. In our example, if SubmitLetter( ) does not occur within two weeks, the SendMessage event is triggered for the teacher and the mentor. If the 300 word minimum is not met for a letter, the teacher remains in the Review state, and if the student does not open the letter for a period of time sufficient to read the letter they remain in the ReadLetter state. If SubmitLetter did not occur within two weeks, perhaps the ReadLetter state is shortened.

Associate content with projects.
Content may be any generally supported multimedia data type. Resources may be associated with a project or an object, and rules may be defined for project or object events that relate to the content. For example, five genres of books may be associated with the In2Books curriculum, realistic fiction, social studies, biography, traditional tales, and science. For each genre there may be grade level books. SelectBook could be a state associated with the student role, and when the student is in the SelectBook state the resources associated with the project would be displayed to the user as options to select.

Select metadata attributes for the curriculum unit, content, and each type of participant.
Metadata are data about the content, objects, projects or curriculum. In the presently-described example, metadata about the content could be grade level and role.

Write rules that determine the content to display with an event or participant.
An example of such rule may be that if a participant is a student in third grade, then display a block of content suitable for third grade students, and if the participant is a teacher of twelfth grade students, then display a block of content suitable for teachers.

Write rules that determine what people to group for collaboration.
An example of such a rule is if the difference between a first participant in a first group and a second participant in a second group is less than four degrees of similarity, then the participants are matched to work collaboratively on the current curriculum project.

Publish curriculum unit.

Relation to Social Networks

Generally speaking, a social network is defined by members who may be in groups or a network of users with a common role. In this instance, the social network may be considered a collection of groups—each member capable of having one or more associated roles. A member may also have a set of attributes about or otherwise related to their interactions within a social network that may be maintained and, as desired, could also be made programmatically accessible. Members can have access based on a multi-level access control system to standard social networking features, such as posting in blogs, discussion forums, media galleries, web pages, messages, announcements, maintaining list of friends, and so on based on their membership to a group or role-based network.

Such a social-based system is significantly enhanced with attributes an object-based system, which, for example, can define collections of objects that are of various types and can have attributes that are specified per role. The system may have object-based systems that are contributed by one or more users in a community and/or may be imported from other systems and repository, for example, by using industry standard data representations such as SCORM or XML. Graphical user interface-based tools are used to construct or augment these data, including (e.g., with association to projects) role-based events, states and rules for transitions, and publishing aspects of the object-based systems to the social network, in this instance a social learning network.

A member of a social learning network may decide to participate in an object-based system. The object-based system runtime engine embedded in a learning platform or compiler reads the description of the curriculum unit that defines the objects, events, rules and/or roles, then as desired processes those rules against one or more activities of one or more members in the network.

A particularly apt example of the foregoing involves 21st Century curricula that frequently includes collaborative projects that include interacting online using blogs, discussion forums, sharing media and creating web pages. Typically, these tools organize information in the following manner:

Blogs: are personal web logs that are typically authored by a single (or small number of) author(s) and they are used to present a point-of-view. Other members of the social network who are interested in the subject matter can interact by commenting on blog posts.

Discussion Forums: in discussion forums, users post and reply to questions. Forums are often used for support whereby users search for answers to their question based on a previous interaction before posting their question.

Media galleries: are used to upload and distribute files. Uploaded files are frequently video, although there are many sites that contain collections for documents to share.

Web pages: are generally owned and maintained by a user or group of users (such as an organization) and present a face to the world on the web.

In contrast to the above described tool or functional point of view (and its relationship to people), the primary point-of-view in an object-based system is the object (or a collection of objects, such as a curriculum) and the participants. Social networking tools most typically organize user interaction around the selected data structure (e.g., blog), but do not provide the capability to view all of the posts—for example on blogs and in forums—made related to a project by a user—or by a group of users—say all of the students in a particular class. A unique aspect of the object-based system described herein is organization such that data can be found and displayed, assessed or analyzed by user (or groups of users) rather than solely by the data structure. The object-based system can display, for example, all of the posts for a user by curriculum unit and project, rather than merely by data structure, thus efficiently enabling the creation of an electronic portfolio that collects all student work with the individual (and does not rely solely on users to have tagged or otherwise collected their work). While users interact with "standard" collaborative tools, the object-based system of the present invention can store curriculum context and other desired information and the system can collect the data by user, role and other means, rather than solely by tool—so the system can find (and as desired) analyze, describe and display collections of work in multiple views—for example, by tool, curriculum unit, subject matter, user, groups of users, users having similar activities and events, etc.

Using modern computing conventions, the object-based system service can be invoked for example, by any (e.g., any authorized) snippet of code, such as a widget, that could be placed throughout a web site to dynamically collect and display either lists of members, content, scheduled events, activities, tasks, etc. that are relevant to one or more members who access a given page at a particular time (or desired to be displayed based on the invocation of rules).

In this context, it should be understood that a "curriculum" may be defined very broadly. A curriculum comprises a collection of projects and/or objects in the case of a solitary project, and a project could be a wedding, for example. In this instance, the project includes a ritual followed by a ceremony that culminates in the sharing of food and so on. A project can include any number of people across a distributed space with peripheral distance participation. People physically separated from each other, lacking all physical cues that go along with human interaction, may yet absorb some aspect of the interaction that is important for learning. The difference in a wedding is that the learning is social and augmented by content. Thus, it is desirable for the context, the activities, the participants, and the content, etc. to be defined in order to potentially collect individuals around an activity related to subject matter that is of interest to participants.

Preferred Examples

While the "stateful" and other principles described herein have broad applicability to social-based and content-based networks that, for example, in the context of the Internet as a communication medium generally lacks accessible data concerning "state," role and other variables for use in informing objects and programs, a particularly useful application of the present invention concerns learning and learn management, where sequence based regimens (curriculum) help users to gain skills as they proceed. In addition, it would be desirable for networks, such as Learning Management Systems, to much more broadly enable project-based, collaborative, and other functions describe herein. Therefore, the following examples should be read as illustrative of the invention described herein.

A project-based literacy learning program based on authentic collaboration between students and mentors is an example of a curriculum that can be defined using the object-based system and its programming language. Examples of operations on the curriculum unit include creating a new unit, opening an existing unit, closing the currently-open unit, saving the unit, importing definitions from open standard formats to the unit, exporting the unit to standard formats. Creating a new unit requires giving it a name. For example, a new literacy learning program called the INFORMED READER SERIES may be created. Another example of a curriculum unit could be a chess club where users are dynamically grouped based on a combination of attributes such as level and rate of play, a book club where users read and discuss the same book, a science project with a structured investigation protocol, a foreign language practice community, a cultural exchange between classrooms in China and the US.

Once a unit has been created, projects can be added to the unit, edited, or deleted as described above. Projects can be named, described, and assigned attributes such as level or curriculum standards met. Examples of projects in the INFORMED READER SERIES include Introduction, Social Studies, and Science. Examples of projects in the chess club curriculum include Openings, Mid-Game, and Tournament. Examples of book club projects are selecting a book, reading the book, reading the author's blog, posting and replying to a discussion forum about the book, and commenting on the author's blog.

The roles of participants in each project or unit are identified. In the literacy example, the participant roles could be a teacher, student, or mentor. In the chess club curriculum, all participants could be players. In the book club example there could be readers and authors. In the science project there could be a principal investigator, subject matter expert, data collector, and report writer.

Each project includes 1 to Na states that include events and rules and metadata associated with the project. In the Introduction project, the states could include the mentor writing, the teacher reviewing, the student reading, the student writing, and the teacher reviewing. The states for the Social Studies project could be, for example, the student picking a book on maps and geography, the teacher approving the selection, the student and mentor reading the book, the mentor writing to the student about the book, the teacher reviewing the mentor's letter, the student reading the letter and then writing back. The rules of the writing activities could be required, whereas the reading and reviewing states may be optional.

The events could be further time-bound. For example, the mentor must start the Introduction project and write within two weeks, the teacher must review the mentor's writing within three days, and the student must write back within two weeks. In the chess club curriculum, Tournament project players may be required to sign up by a specific date and time, engage in play at a scheduled time, and complete 40 moves within a specific time limit. In the book club example, activities could be more loosely constrained and only require posting or replying in the book-related discussion forum. The science project could have highly structured activities that adhere to strict data collection and observation protocols such that the experiment could be independently repeated.

Rules can be associated with events that determine dynamic interaction with data and networks. With respect to the Introduction project, for example, the object-based system may search for students and mentors with an interest in Social Studies and Science and, for each student, if the difference between the student's and the mentor's interest in Social Studies multiplied by a weighting factor is less than four semantically-related concepts, then invites the student and mentor to be matched with each other to work on the Introduction project. With respect to the chess club curriculum, a rule may require each player to be of a specific experience level equal to that defined by the notice of the Tournament. The book club may have a rule that the themes, characters, or topics related to the book must be included in a forum post and a reply must have some semantic relationship to the question that was posed. In the science project, the expert could require meeting a quality rating that is generated by peers within the community, whereas a teacher could assign a group of students to the science project and the students could determine their roles on the project.

The object-based system reads the definition of units, projects, participants, events and content and executes rules that dynamically determine the grouping of people, presentation of content, and execution of processes. In the Introduction example, when a user signs on for the first time a welcome message with project instructions could be displayed, and the second time the user signs on a reminder to write an Introductory Letter to their mentor could be displayed. When the user goes to the authoring environment, support content such as key vocabulary, a checklist, or thoughtful questions that are specific to the Introductory project could be included in the writing experience. If the student or mentor were in the Social Studies project their entire home page could be switched to reflect that genre of study and their current state (e.g., read letter, read book, write letter). In the example of the chess club tips and tricks for openings, mid-game, and closings could be displayed when players reach that state in the project.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

The invention claimed is:

1. A method for executing course projects in a learning sequence comprising the steps of:
retrieving, by a learning platform, a programmed project comprising:
a) at least one instruction set specifying at least one rule capable of reacting differently to different inputs; and
b) at least one executable, social network-based learning object having at least one associated attributes, wherein the at least one rule is capable of reacting dynamically to inputs adapted to the rule for controlling the at least one attribute associated with the object and triggering behavior based on the at least one attribute associated with the object or other inputs and wherein the at least one instruction set specifies a manner of use in which the at least one executable, social network-based learning object can be executed;
retrieving the instruction set independently from the executable, social network-based learning object;
determining, by the learning platform, an action to perform with respect to the programmed project based on the at least rule and the at least one retrieved instruction set, wherein the action may be triggered by an event recognized by the runtime or not recognized by the runtime; and executing the determined action on the programmed project by the learning platform.

2. A method for creating a curriculum unit in a learning management system comprising the steps of:
creating, at a computer server, in the learning management system at least one programmed project associated with the curriculum unit, the programmed project comprising:
a) at least one instruction set specifying at least one rule capable of reacting differently to different inputs; and
b) at least one executable, social network-based learning object having at least one associated attributes wherein the at least one rule is capable of reacting dynamically to inputs adapted to the rule for controlling the at least one attribute associated with the object and triggering an event based on the at least one attribute associated with the object or other inputs and wherein the at least one instruction set specifies a manner of use in which the at least one executable, social network-based learning object can be executed;
setting, at the computer server, the properties for the curriculum unit in the learning management system; creating, at the computer server, at least one state for the at least one programmed project;
retrieving, at the computer server, the instruction set independently from the executable, social network-based learning object and determining at least one event for the at least one state in the learning management system based on the at least one rule and the at least one retrieved instruction set; and defining, at the computer server, at least one role of at least one participant in the learning management system with respect to the curriculum unit.

3. The method of claim 2 further comprising providing a title for the curriculum unit.

4. The method of claim 2 further comprising adding another project associated to the curriculum unit in the learning management system.

5. The method of claim 2 further comprising adding another executable, social network-based learning object associated with the at least one programmed project to the curriculum unit in the learning management system.

6. The method of claim 4 further comprising adding another executable, social network-based learning object associated with the another project to the learning management system.

7. The method of claim 2 further comprising the at least one event based on an occurrence of the at least one rule.

8. The method of claim 2 further comprising associating content with the at least one programmed project.

9. The method of claim 8 further comprising selecting metadata attributes for at least one of the curriculum unit, the content, and the role of the participant.

10. The method of claim 8 further comprising establishing at least one content rule, wherein the at least one content rule determines at least a portion to display based on at least one of the at least one event and the at least one participant.

11. The method of claim 2 further comprising establishing at least one group rule, wherein the learning management system comprises a plurality of participants and the group rule determines which of the plurality of participants to group.

12. The method of claim 2 further comprising publishing the curriculum unit.

13. An online education system accessible by a plurality of users comprising:
   a curriculum unit that defines at least one executable, social network-based learning object and that defines an attribute and a rule associated with the attribute that is capable of reacting dynamically to inputs adapted to the rule for controlling the attribute and differently to different inputs and that specifies a manner of use in which the at least one executable, social network-based learning object can be executed;
   wherein the instruction set is capable of being retrieved independently from the executable, social network-based learning object; and
   an electronic runtime engine configured to read the curriculum unit and to alter the attribute of the at least one executable, social network-based learning object associated with any rules that are triggered by the occurrence of the at least one event.

14. The online education system of claim 13, wherein the curriculum unit defines a plurality of roles, wherein each of the plurality of executable, social network-based learning objects may be associated with one or more of the roles.

15. The online education system of claim 14 wherein the plurality of roles includes a teacher role and a student role.

16. The online education system of claim 15 wherein the plurality of roles includes a mentor role.

17. The online education system of claim 13, wherein an action by the at least one executable, social network-based learning object associated with a first user causes the events to occur, whereby the electronic runtime engine alters an attribute of a second executable, social network-based learning objects associated with a second user, wherein the attribute of the second executable, social network-based learning object is associated with the rule triggering the first event.

18. The online education system of claim 17, wherein a first portion of content presented to the second user by the online education system is dynamically altered based on the attribute of the second executable, social network-based learning object altered by the rule triggering the first event without any action on the part of the second user.

19. The online education system of claim 18 wherein a second portion of content presented to the second user by the online education system is dynamically altered based on an action of the second user without any action on the part of the first user.

20. The online education system of claim 19, wherein a third portion of content presented to the second user by the online education system is dynamically altered based on the attribute of the second executable, social network-based learning object altered by the rule triggering the first event and the action of the second user.

21. The online education system of claim 13 wherein the curriculum unit defines a project associated with of the event.

* * * * *

UNITED STATES PATENT AND TRADEMARK OFFICE
CERTIFICATE OF CORRECTION

| | | |
|---|---|---|
| PATENT NO. | : 8,798,519 B2 | Page 1 of 1 |
| APPLICATION NO. | : 12/463266 | |
| DATED | : August 5, 2014 | |
| INVENTOR(S) | : Dozier et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this
Fifteenth Day of September, 2015

Michelle K. Lee
*Director of the United States Patent and Trademark Office*